United States Patent

[11] 3,632,165

| [72] | Inventor | Wilbur D. Miller |
| | | Rural Route 1, Norton, Kans. 67654 |
| [21] | Appl. No. | 60,314 |
| [22] | Filed | Aug. 3, 1970 |
| [45] | Patented | Jan. 4, 1972 |

[54] AUXILIARY CAR SEAT
3 Claims, 7 Drawing Figs.

[52] U.S. Cl. .................................................... 297/254,
297/343
[51] Int. Cl. .................................................... A47d 1/10
[50] Field of Search .................................................... 297/254,
255, 256, 152, 343, 341

[56] References Cited
UNITED STATES PATENTS
2,208,392  7/1940  Sadler .......................... 297/256

| 2,708,474 | 5/1955 | Lindroth | 297/343 |
| 540,034 | 5/1895 | Swan | 297/256 |
| 1,802,607 | 4/1931 | Krause | 297/343 |
| 2,091,063 | 8/1937 | Ball | 297/342 X |
| 2,742,954 | 4/1956 | Boyajian | 297/152 |

*Primary Examiner*—Francis K. Zugel
*Attorney*—John H. Widdowson

ABSTRACT: An auxiliary car seat is provided mountable with the back of a vehicle seat. A frame engageable with the back of the vehicle seat supports a reclinable auxiliary seat having a back and seat hinged thereto. A lock assembly is provided to hold the seat in the upright position, or in the desired reclined position.

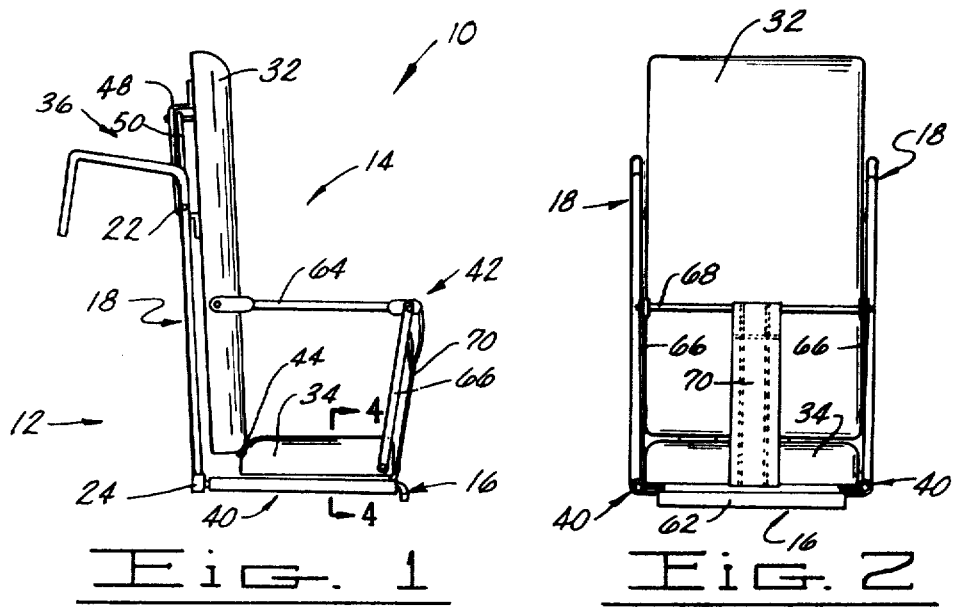
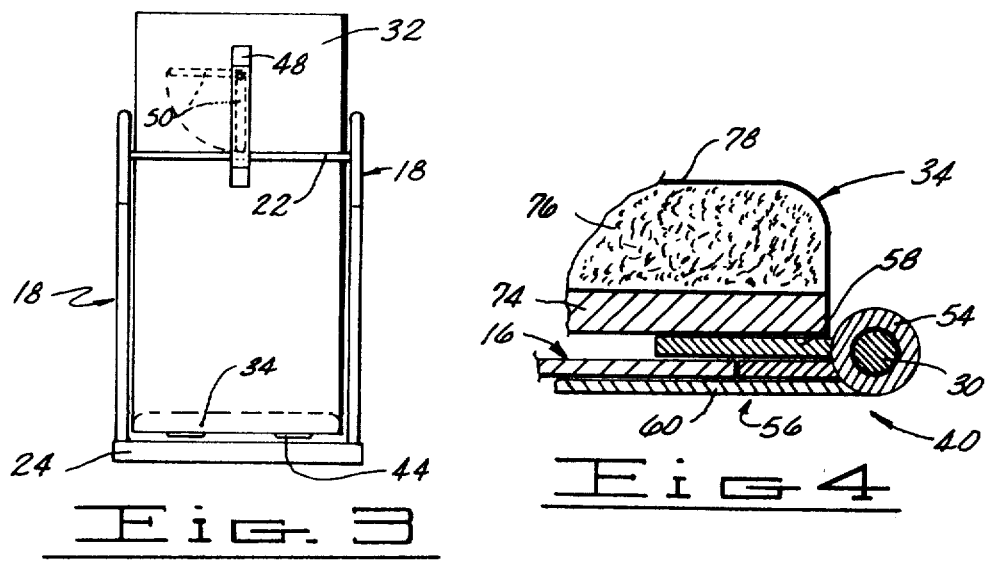

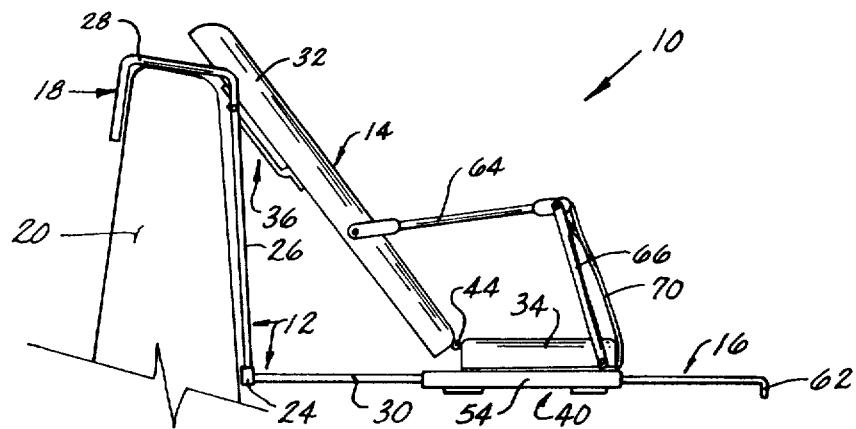
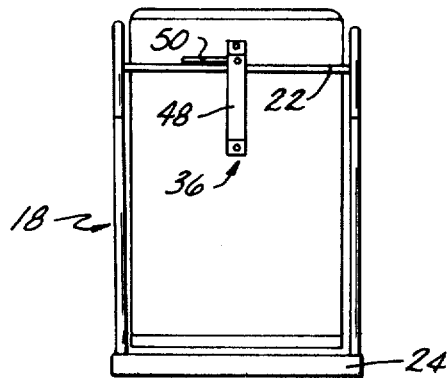
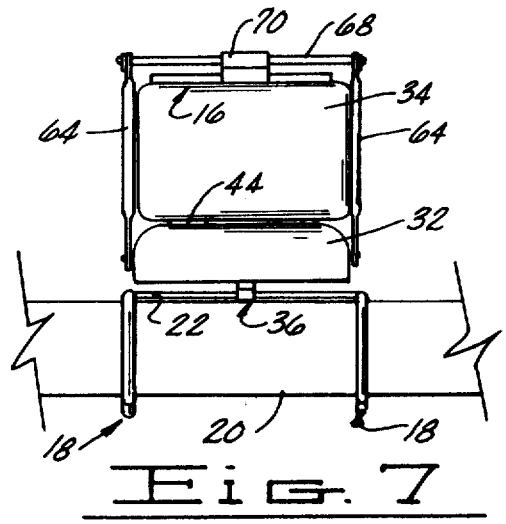

AUXILIARY CAR SEAT

Auxiliary seats are known in the art as attachable to vehicle seats, and ones for small children to use. However, these seats become rather permanent when installed in a vehicle and are difficult to remove due to their attachment to the bottom portion of the vehicle seat or the floor structure of the vehicle, or they are not adjustable. Also, these devices have no inherent means to restrain a child placed in the seat nor do they have any footrest to provide more comfort and contentment.

In a preferred embodiment of this invention a child's car seat includes a frame assembly mountable with the back of a vehicle car seat and a reclinable seat with armrests and body-retaining structure and an extendable footrest. The frame assembly includes vehicle seat attaching members formed to hold the child's seat on the back of the vehicle seat by hooking over the top of it. The car seat includes a back member and a pivotally connected bottom member with the bottom member slidable forward to achieve the reclined position; armrests join the seat back and bottom and pivot therewith. They support a transverse member across the front of the seat and a restraining strap. The footrest is mounted under the bottom member of the seat and can be extended therefrom regardless of the incline of the seat.

One object of this invention is to provide an auxiliary vehicle seat structure overcoming the aforementioned disadvantages of the prior art devices.

Still, one other object of this invention is to provide an auxiliary seat structure easily mountable on and removable from the back of the vehicle seat.

Another object of this invention is to provide a child's car seat structure which is easily reclinable and has an extendable footrest to make the child more comfortable.

Still one further object of this invention is to provide a child's car seat structure which has an inherent safety means to retain the child within the seat.

Yet one further object of this invention is to provide a child's car seat which is attractive in appearance, economical to manufacture and simple to use.

Various other objects, advantages, and features of the invention will become apparent to those skilled in the art from the following discussion, taken in conjunction with the accompanying drawings, in which:

FIG. 1 is a side elevation view of the child's car seat in the upright position and with the foot rest retracted;

FIG. 2 is a front elevation view of the child's car seat with the seat in the upright position;

FIG. 3 is a rear elevation view of the child's car seat in the upright position with the lock shown in dotted lines in the locked and unlocked positions;

FIG. 4 is a cross-sectional view of a portion of the sliding seat mount taken on line 4—4 of FIG. 1;

FIG. 5 is a side elevation view of the car seat shown hung over a car seat with the child's car seat in the fully reclined position and the footrest extended;

FIG. 6 is a rear elevation view of the child's car seat in the fully reclined position; and FIG. 7 is a top plan view of the child's car seat in the upright position hung on an automotive-type seat.

The following is a discussion and description of preferred specific embodiments of the child's car seat of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1 a child's car seat of this invention, indicated generally at 10, is shown in the upright position. The child's car seat basically includes a frame 12 and seat 14 with a footrest 16.

The frame 12 includes car seat attaching members 18 that are preferably curved to pass over the top of a car seat, indicated at 20, extending forward under the seat 14 and a transverse member 22 at the top of the frame 12 and 24 at the bottom thereof. The attaching members 18 have an elongated vertical portion 26 that normally rests on the front of the car seat 20, and a curved portion 28 which passes over the top of the car seat 20 extending a short distance down the back thereof. Also, the attaching members 18 have a horizontal lower member 30 which extends forward from the bottom of the vertical portion 26 at the lower transverse member 24 and supports seat 14. The upper transverse member 22 supports the back of the seat 14 and is below the peak of the attachment members 18. It is to be noted that the attaching members 18 are spaced at a substantial distance apart, but they are spaced such that the child's car seat 10 can be hung on a conventional bench-type vehicle seat or a conventional bucket-type vehicle seat.

The seat 14 includes a back member 32 hingedly attached to a bottom member or seat 34, lock assembly 36, slidable seat mount 40 and body restraining apparatus 42. The back 32 and bottom 34 of the seat 14 are narrower than the attaching members and are connected together at the hinge 44. The bottom seat member 34 is attached to a slidable seat mount assembly 40 which slides on the lower horizontal frame members 30 to provide the reclining effect of the car seat 10. The back 32 rests on the upper transverse member 22 and has the lock assembly 36 on the back thereof.

The lock assembly 36 includes a strap member 48 and a wedge member 50 pivotally mounted in the top of the strap member 48. The transverse member 22 passes through the slot formed between the back of the seat 32 and the strap 48. With the seat 14 in the full upright position the wedge 50 can be positioned vertically as shown in FIGS. 1 and 3 to prevent the seat back 32 from moving downward or the wedge 50 can be rotated horizontally, as shown in FIG. 3 to allow downward movement of the seat back 32. The seat 14 when in fully reclined position is as shown in FIGS. 5 and 6 with the wedge horizontal and the upper transverse member 22 in the top of the strap 48 against the wedge 50.

The seat mount assembly 40 includes means to mount the seat or bottom 34 so it will slide on the horizontal frame members 30 and means to hold the footrest 16. Slide members 54 encircle the horizontal frame members 30 and slide thereon, they extend from the front edge of the seat bottom 34 under same and extend substantially behind it. When in the full upright position the slide members 54 contact the lower transverse member 24 properly positioning the bottom of the seat 34. A support member, indicated generally at 56, extends between the slide members 54 to mount the seat bottom member 34 and form a guide and support for the footrest. The upper portion 58 of the support member 56 attaches the outer edge of the seat bottom 34 and the lower portion 60 extends between the slide members 54 on both sides of the seat 14, retains them in the parallel relation and provides support for the footrest 16. The footrest 26 has a downwardly turned forward end 62 that provides a means to pull it forward from the guide when desired. The footrest 16 can be pulled out with the seat 14 in any position.

The body-restraining apparatus 42 comprises a combination armrest-safety device. The armrest is formed by horizontal links 64 pivotally connected to the seat back 32 pivotally joining upright links 66 pivotally mounted with the front of the seat or bottom 34 and have a transverse front link 68 between the joint of the other links 64 and 66. A safety strap 70 is attached in the center of the front link 68 and is attached to the front of the bottom seat member 34. In use this fits between the legs of a child occupying the seat 14. When the seat 14 is tilted from the reclining position to the upright position or vice versa, the horizontal links remain substantially horizontal and parallel.

Both portions of the seat 14, the back 32 and the bottom 34 are preferably constructed with a rigid support member 74, pad 76 and covering 78 as shown in FIG. 4. The pad 76 is sufficient to provide relatively good comfort for a child occupying the seat 14. The covering 76 is preferably a plastic or vinyllike material which is durable and easily cleaned.

In the manufacture of the child's car seat 10 of this invention, it is obvious the frame 12 is easily constructed from numerous materials, steel, aluminum, etc., and the seat back 32 and bottom 34 can be constructed of numerous materials as these described to achieve the end product.

In the use of the child's car seat 10 of this invention, it is seen that same provides a structure easily attachable to and removable from a vehicle seat. Also the structure is usable on the common vehicle seats of both the bench and bucket type.

As will be apparent from the foregoing description of the applicant's child's car seat structure, relatively inexpensive means have been provided to carry a child in the seat of a vehicle at a level which he can see out and be relatively safe. The structure provides a seat which is easily reclined and has a footrest for the comfort of the child occupant. The child's car seat structure is economical to manufacture, simple to use, attractive in appearance and may be easily attached to numerous particular styles of vehicle seats.

While the invention has been described in conjunction with preferred specific embodiments thereof, it will be understood that this description is intended to illustrate and not to limit the scope of the invention, which is defined by the following claims.

I claim:

1. An auxiliary seat mountable with the back portion of a vehicle seat comprising:
   a. a frame having the vehicle seat attaching members shaped to contact the front side of the back of said vehicle seat, extend over the top of same and a distance down the backside of same,
   b. a reclinable seat means having a back, armrests and a bottom seat member hingedly attached thereto, said seat slidably mounted with said frame means, said vehicle seat attaching members extending forward under said bottom seat member, said bottom seat member mounted with said frame by means of slidable support members attached to forward extending portions of said vehicle seat attaching members to slide thereon and extend therealong in a forward direction away from said vehicle seat back, said armrests having an upper horizontally positionable member pivotally attached to said back and pivotally attached at a forward joint, an upright member pivotally attached to said seat bottom member, a transverse rest member joining said forward joint on said armrests and supporting a body-retaining strap member in a central portion thereof, said body-retaining strap member attaching said transverse rest member and said bottom seat member,
   c. lock means mounted with said reclinable seat means and said frame means and having a loop member with a pivotable wedge member therein mounted on the upper portion of the backside of said back, said loop member enclosing a transverse support member joining said vehicle seat attaching members, said lock means operable to hold said reclinable seat in a fixed position and to limit the reclining position of same, and
   d. a footrest means mounted with said frame under said bottom seat member and extendable therefrom.

2. The auxiliary seat as described in claim 1 wherein:
   a. said seat in a fully upright position has said back member substantially parallel with said vehicle seat back, said lock wedge member positioned in said loop member to restrict sliding pivotal movement of said seat and can have said footrest means extended from thereunder said bottom member.

3. The auxiliary seat as described in claim 1 wherein:
   a. said seat in a fully reclined position has said back at an acute angle relative said vehicle seat back, said bottom member extended on the forward portion of said vehicle seat attachment members, said lock wedge member positioned in said loop member to allow sliding pivotal movement of said seat means and can have said footrest means extended from thereunder said bottom member, and
   b. said seat back can be positioned in a reclined position not as greatly reclined as said fully reclined position.

* * * * *